United States Patent
Boiko et al.

(10) Patent No.: US 10,685,218 B2
(45) Date of Patent: Jun. 16, 2020

(54) PARENTAL ADVISORY COMPUTER SYSTEMS AND COMPUTER-IMPLEMENTED METHODS OF USE THEREOF

(71) Applicant: Facemetrics Limited, Nicosia (CY)

(72) Inventors: Mikhail Boiko, Cracow (PL); Aleh Arol, Minsk (BY); Dzianis Pirshtuk, Minsk (BY)

(73) Assignee: Facemetrics Limited, Nicosia (CY)

( * ) Notice: Subject to any disclaimer, the term of this patent is extended or adjusted under 35 U.S.C. 154(b) by 0 days.

(21) Appl. No.: 16/516,934

(22) Filed: Jul. 19, 2019

(65) Prior Publication Data

US 2020/0026919 A1 Jan. 23, 2020

Related U.S. Application Data

(60) Provisional application No. 62/701,106, filed on Jul. 20, 2018.

(51) Int. Cl.
*G06K 9/00* (2006.01)
*G06F 3/01* (2006.01)
(Continued)

(52) U.S. Cl.
CPC .......... *G06K 9/00335* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS 6,097,295 A * 8/2000 Griesinger ............... A61B 5/18
340/576
6,608,615 B1 * 8/2003 Martins ............... G06F 16/9577
345/156

(Continued)

OTHER PUBLICATIONS

Driver Gaze Tracking and eyes off the road detection system, Francisco Vicente et al., IEEE, 1524-9050, 2015, pp. 2014-2027 (Year: 2015).*

(Continued)

*Primary Examiner* — Jayesh A Patel
(74) *Attorney, Agent, or Firm* — Greenberg Traurig, LLP (57) ABSTRACT

Some embodiments of a computer-implemented method and system can entail continuously obtaining a visual input comprising a plurality of representations of at least one eye of at least one user to continuously track the plurality of representations over a predetermined time duration. The at least one processor can continually apply at least one eye-gaze movement tracking (EGMT) algorithm to form a time series of eye-gaze vectors. Continually inputting the time series of eye-gaze vectors into an Activity Tracking Neural Network (ATNN) can determine an attentiveness level of the at least one user over the predetermined time duration. The at least one processor can initiate a first action when the attentiveness level is equal to or above a predetermined threshold attentiveness value throughout the predetermined time duration; and initiate a second action when the attentiveness level is below the predetermined threshold attentiveness value throughout the predetermined time duration.

20 Claims, 4 Drawing Sheets

(51) Int. Cl.

| | |
|---|---|
| *G06T 7/20* | (2017.01) |
| *G06T 7/70* | (2017.01) |
| *G06K 9/62* | (2006.01) |
| *G06N 3/08* | (2006.01) |
| *G06T 7/90* | (2017.01) |
| *G06T 7/00* | (2017.01) |
| *G06T 17/20* | (2006.01) |
| *G09B 5/02* | (2006.01) |

(52) U.S. Cl.
CPC ......... *G06F 3/013* (2013.01); *G06K 9/00221* (2013.01); *G06K 9/00228* (2013.01); *G06K 9/00248* (2013.01); *G06K 9/00604* (2013.01); *G06K 9/6256* (2013.01); *G06K 9/6267* (2013.01); *G06N 3/08* (2013.01); *G06T 7/0012* (2013.01); *G06T 7/20* (2013.01); *G06T 7/70* (2017.01); *G06T 7/90* (2017.01); *G06T 17/20* (2013.01); *G06F 2203/011* (2013.01); *G06T 2207/10016* (2013.01); *G06T 2207/20084* (2013.01); *G06T 2207/30201* (2013.01); *G09B 5/02* (2013.01)

(56) References Cited

U.S. PATENT DOCUMENTS

| | | | | |
|---|---|---|---|---|
| 8,719,278 | B2* | 5/2014 | Karmarkar | G06F 16/951 |
| | | | | 707/748 |
| 9,182,819 | B2* | 11/2015 | Strupczewski | G06T 17/10 |
| 9,411,417 | B2 | 8/2016 | Arar et al. | |
| 9,913,578 | B2* | 3/2018 | Taguchi | A61B 3/0025 |
| 10,092,206 | B2* | 10/2018 | Sela | A61B 5/0482 |
| 10,157,313 | B1* | 12/2018 | Zhang | G06F 3/013 |
| 10,339,659 | B2* | 7/2019 | Dey | G06T 7/20 |
| 2011/0228051 | A1* | 9/2011 | Dedeoglu | H04N 13/296 |
| | | | | 348/46 |
| 2012/0162603 | A1* | 6/2012 | Dejima | A61B 3/113 |
| | | | | 351/209 |
| 2013/0054622 | A1* | 2/2013 | Karmarkar | G06F 16/951 |
| | | | | 707/749 |
| 2013/0058529 | A1* | 3/2013 | Levin | A61B 3/113 |
| | | | | 382/103 |
| 2013/0093888 | A1* | 4/2013 | Kim | G08B 21/06 |
| | | | | 348/148 |
| 2014/0148988 | A1* | 5/2014 | Lathrop | B60W 50/10 |
| | | | | 701/23 |
| 2014/0163410 | A1* | 6/2014 | Sela | A61B 5/0482 |
| | | | | 600/545 |
| 2014/0204193 | A1* | 7/2014 | Zhang | G06K 9/00597 |
| | | | | 348/78 |
| 2014/0368644 | A1* | 12/2014 | Seok | G06K 9/00845 |
| | | | | 348/143 |
| 2015/0003819 | A1* | 1/2015 | Ackerman | G02B 7/287 |
| | | | | 396/51 |
| 2015/0009010 | A1* | 1/2015 | Biemer | G06F 21/32 |
| | | | | 340/5.83 |
| 2015/0022664 | A1* | 1/2015 | Pflug | H04N 7/181 |
| | | | | 348/148 |
| 2015/0131850 | A1* | 5/2015 | Qvarfordt | G06K 9/00617 |
| | | | | 382/103 |
| 2015/0193664 | A1* | 7/2015 | Marti | B60W 40/08 |
| | | | | 382/103 |
| 2015/0235096 | A1* | 8/2015 | Konigsberg | G08B 21/06 |
| | | | | 340/439 |
| 2015/0379362 | A1* | 12/2015 | Calmes | G06K 9/2036 |
| | | | | 348/136 |
| 2016/0009411 | A1* | 1/2016 | Davalos | B64D 47/02 |
| | | | | 345/156 |
| 2016/0095511 | A1* | 4/2016 | Taguchi | A61B 3/0025 |
| | | | | 351/209 |
| 2017/0061253 | A1* | 3/2017 | Burgos | G06T 7/70 |
| 2017/0236304 | A1* | 8/2017 | Kempinski | G06F 3/013 |
| | | | | 382/117 |
| 2017/0285337 | A1* | 10/2017 | Wilson | A61B 3/113 |
| 2017/0293794 | A1* | 10/2017 | Tsurumi | G06T 7/70 |
| 2018/0120932 | A1* | 5/2018 | Sengelaub | G06F 3/013 |
| 2018/0286261 | A1* | 10/2018 | Ahuja | G09B 5/08 |
| 2019/0094958 | A1* | 3/2019 | Williams | G06F 3/013 |
| 2019/0147607 | A1* | 5/2019 | Stent | G06N 5/046 |
| | | | | 382/103 |

OTHER PUBLICATIONS

The importance of eye gaze and head pose in estimating levels of attentions., Stylianos Asteriadis et al., IEEE, 2011, 978-0-7695-4419-9, pp. 186-191 (Year: 2011).*

Al-Rahayfeh, Amer et al., "Classifiers Comparison for a New Eye Gaze Direction Classification System", 978-1-4577-1343-9/12, 2014 IEEE (6 pages).

* cited by examiner

PARENTAL ADVISORY COMPUTER SYSTEMS AND COMPUTER-IMPLEMENTED METHODS OF USE THEREOF

CROSS-REFERENCE TO RELATED APPLICATIONS

This application claims priority to U.S. Provisional Application No. 62/701,106, entitled "COMPUTER SYSTEMS AND COMPUTER-IMPLEMENTED METHODS CONFIGURED TO TRACK NUMEROUS USER-RELATED PARAMETERS DURING USERS' INTERACTION WITH ELECTRONIC COMPUTING DEVICES," filed on Jul. 20, 2018, incorporated herein in its entirety.

FIELD OF TECHNOLOGY

The present disclosure generally relates to improved computer-based systems and improved computing devices configured for tracking eye-related parameters during user interaction with electronic computing devices.

SUMMARY OF DESCRIBED SUBJECT MATTER

In some embodiments, the present disclosure provides an exemplary technically improved computer-based method that includes continuously obtaining, by at least one processor, a visual input comprising a plurality of representations of at least one eye of at least one user to continuously track the plurality of representations over a predetermined time duration; wherein the visual input comprises a series of video frames, a series of images, or both; continuously applying, by the at least one processor, at least one eye-gaze movement tracking (EGMT) algorithm to the visual input to form a time series of eye-gaze vectors; continuously inputting, by the at least one processor, the time series of eye-gaze vectors into an Activity Tracking Neural Network (ATNN) to determine an attentiveness level of the at least one user over the predetermined time duration; initiating, by the at least one processor, a first action when the attentiveness level is equal to or above a predetermined threshold attentiveness value throughout the predetermined time duration; and initiating, by the at least one processor, a second action when the attentiveness level is below the predetermined threshold attentiveness value throughout the predetermined time duration.

In some embodiments, the present disclosure provides a system including: a camera component, wherein the camera component is configured to acquire a visual input, wherein the visual input comprises a real-time representation of at least one eye of at least one user and wherein the visual input includes at least one video frame, at least one image, or both; at least one processor; a non-transitory computer memory, storing a computer program that, when executed by the at least one processor, causes the at least one processor to: continuously apply at least one eye-gaze movement tracking (EGMT) algorithm to the visual input to form a time series of eye-gaze vectors; continuously input the time series of eye-gaze vectors into an Activity Tracking Neural Network (ATNN) to determine an attentiveness level of the at least one user over the predetermined time duration; initiate a first action when the attentiveness level is equal to or above a predetermined threshold attentiveness value throughout the predetermined time duration; and initiate a second action when the attentiveness level is below the predetermined threshold attentiveness value throughout the predetermined time duration.

In some embodiments, the visual input further comprises a plurality of representations of at least one additional facial feature of the at least one user, wherein the at least one additional facial feature is chosen from at least one of: eye gaze, head pose, a distance between a user's face and at least one screen, head posture, at least one detected emotion, or combinations thereof.

In some embodiments, the at least one processor continuously applies to the visual input, at least one facial feature algorithm, wherein the at least one facial feature algorithm is chosen from at least one of: at least one face detection algorithm, at least one face tracking algorithm, at least one head pose estimation algorithm, at least one emotion recognition algorithm, or combinations thereof.

In some embodiments, application of the at least one facial feature algorithm transforms the representation of the at least one additional facial feature of the at least one user into at least one additional facial feature vector associated with the at least one additional facial feature, wherein the at least one facial feature vector is chosen from: at least one face angle vector, at least one facial coordinate vector, or a combination thereof.

In some embodiments, the at least one processor continuously obtains a time series of additional facial feature vectors.

In some embodiments, the plurality of representations includes at least one eye movement of at least one user.

In some embodiments, the ATNN is trained using a plurality of representations of a plurality of users, wherein each representation depicts each user in an attentive state.

In some embodiments, the predetermined time duration ranges from 1 to 300 minutes.

In some embodiments, the at least one eye gaze vector comprises at least two reference points, the at least two reference points including: a first reference point corresponding to an eye pupil; and a second reference point corresponding to an eye center.

In some embodiments, the at least one eye gaze vector is a plurality of eye gaze vectors, wherein the plurality of eye gaze vectors comprises at least one first eye gaze vector corresponding to a first eye and at least one second eye gaze vector corresponding to a second eye.

In some embodiments, the at least one processor averages the at least one first eye gaze vector and the at least one second eye gaze vector.

In some embodiments, the first action is chosen from: a motivational message, unlocking of at least one game level, unlocking of electronic content, or initiation of a bonus round.

In some embodiments, the second action comprises the following steps performed by the at least one processor: resetting the predetermined time duration; and repeating the method over the predetermined time duration until the at least one eye gaze vector indicates that the user's attentiveness level is equal to or above a predetermined threshold attentiveness value throughout the predetermined time duration.

In some embodiments, the at least one face angle vector comprises a value for head pitch, head roll, and head yaw.

In some embodiments, the at least one facial coordinate vector is a measure of a distance between the user's face and a screen.

In some embodiments, the at least one detected emotion is chosen from fear, happiness, joy, anger, or sadness.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this disclosure can become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the disclosure may be readily combined, without departing from the scope or spirit of the disclosure. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the disclosed specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., "jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," "flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

As used herein, the term "user" shall have a meaning of at least one user.

As used herein, the terms "face" and "head" are used interchangeably and both refer to any portion of a user's body situated above the user's shoulders. The terms "face" and "head" are meant to encompass any accessories worn by the user in the portion of the user's body above the shoulders including but not limited to, a hat, glasses, jewelry and the like.

The present disclosure, among other things, provides exemplary technical solutions to the technical problem of measuring and tracking a user's engagement with an electronic device.

In some embodiments, the present disclosure provides exemplary computer implemented methods for processing visual input information. In some embodiments, the present disclosure processes at least one visual input (e.g., a set of portrait images of users) and performs at least one of the following functions: the real-time generation of one or more automatic recommendations; the restriction of access to electronic content; the control of time spent using a particular type of electronic content; or suggestions or requirements to change a type of activity. In some embodiments, the present disclosure relates to computer implemented methods and systems for parental control.

In some embodiments, the disclosed computer implemented methods are based on the machine learning approach, designed to address a children's inability to focus on reading or learning goal while using electronic computing devices. In some embodiments, the disclosed computer implemented methods allow to set the maximal daily playtime; add learning goals; block mobile applications and games. In some embodiments, the disclosed computer implemented methods allow to make learning time productive. In some embodiments, the disclosed methods detect and track how much time users spend on learning, e.g., reading, doing math or language exercises. In some embodiments, the disclosed system may be configured for a required learning time during which selected applications and games will be blocked, as disclosed further; once the time is over, all the virtual attractions will be available. In some embodiments, the system may be configured for various, as described further, durations of reading and playing or using entertaining applications; the users may decide how much time to allocate for both activities. In some embodiments, the system may be configured for reward for reading with additional play time.

In some embodiments, electronic computing devices may be, without limitation, any electronic computing device at least includes and/or operationally associates with at least one another electronic computer device that includes at least one processor, a digital camera, and an disclosed software. For example, an exemplary electronic computing device may be at least one selected from the group of desktop, laptop, mobile device (e.g., tablet, smartphone, etc.), Internet-of-Things (IoT) device (e.g., smart thermostat), and the like. In some embodiments, the exemplary disclosed software with the exemplary disclosed computer system are configured to track one or more users' interactions with at least one exemplary electronic computing device as one or more users interact with the at least one exemplary electronic computing device and/or another electronic device (e.g., another electronic computing device).

In some embodiments, the disclosed parental advisory system may have the following properties:
(1) educational tasks may be used to unblock the restricted applications;
(2) gamification (gameplay mechanics) may be used to motivate users to perform educational tasks;
(3) rewards may motivate users to perform educational tasks by themselves, as a way to instill a habit of doing tasks by themselves;

(4) analytical system may be implemented for tracking a process of instilling the habit of doing educational tasks; such a system may track: balance between durations of reading (learning) and usage of restricted applications, whether the user reads (learns) longer than their daily goal;

(5) the disclosed system may choose electronic content of various complexity depending on results of completed tasks;

(6) the system may estimate the propensity of the user for a particular educational task by tracking their emotions while doing the task.

In some embodiments, the restricted applications may be any software or electronic content, the access to which is restricted by the user or/and the disclosed system.

In some embodiments, the disclosed computer implemented methods are a smart parental control system that may block games and any selected applications until a user completes desired reading or learning goal. In some embodiments, the user can select any application installed on the device and mark them as restricted. In some embodiments, the exemplary disclosed software are configured to detect and recognize reading activity by tracking user's eyes and/or face. In some embodiments, the exemplary disclosed software with the exemplary disclosed computer system are configured to perform the face detection and tracking in accordance with, without limitation, one or more techniques, methodologies, and/or systems detailed in U.S. Pat. No. 10,049,260, the specific disclosure of which is incorporated herein by reference in its entirety for such purpose. In some embodiments, the exemplary disclosed software with exemplary disclosed computer system are configured to perform the eye-gaze movement tracking in accordance with, without limitation, one or more techniques, methodologies, and/or systems detailed in herein, each of such specific disclosures is incorporated herein by reference in its entirety for such purpose. For example, as detailed herein, in at least some embodiments, the exemplary disclosed software with the exemplary disclosed computer system are configured to calculate at least one eye-gaze vector using at least the two reference points of the eye pupil and eye center. In some embodiments, two eye-gaze vectors may be calculated, each vector for each user's eye. In other embodiments, two eye-gaze vectors may be averaged. In some embodiments, one or two eye-gaze vectors may be used as inputs for the disclosed activity recognition system. For example, the time dependence of eye-gaze vectors may be recorded and the resulting tracks may be used as an input for the activity recognition neural network, as detailed herein. In some embodiments, the results of the activity recognition (for example, reading, playing electronic games, etc.) may be used to lock or unlock an electronic content. In some embodiments, the rules for locking and unlocking the electronic content are detailed further.

In some embodiments, the exemplary disclosed software may allow the user to do at least one of the following:

(1) read electronic content (e.g., electronic books, texts, etc.) using either system applications for reading (e.g., installed with iOS/Android) or special browsers;

(2) read electronic content provided by the operation system, third party libraries, content of web pages from external browsers;

(3) choose any type of schedule from the predefined set, as disclosed further, for each day of the week, select a goal, select a time to play (for example, use restricted applications), select a bonus time as a reward for an attentive reading; the user may receive a bonus time upon completion of the reading or learning goal attentively.

In some embodiments, "attentively" means that the user is not frequently distracted, as detailed herein. In some embodiments, the disclosed parental advisory system may recognize distraction and calculate whether the user is attentive or not while reading or studying.

In some embodiments, the reading may be considered as "attentive" if the duration of continuous reading (Tc) is at least 1 min. In some embodiments, the reading may be considered as "attentive" if the duration of continuous reading (Tc) is at least 3 min. In some embodiments, the reading may be considered as "attentive" if the duration of continuous reading (Tc) is at least 5 min.

In some embodiments, the "attentiveness" (A) may be measured in the following way:

$$A=\text{True, if } T>Tc;\text{ False, otherwise;}$$

where T is the duration of detecting an "attentive" state by the neural network configured to detect user activity classes, as detailed herein. In some embodiments, whether or not the user is in an attentive state can be determined by whether the user's activity is equal to or exceeds a predetermined threshold attentiveness value.

Figure 4:
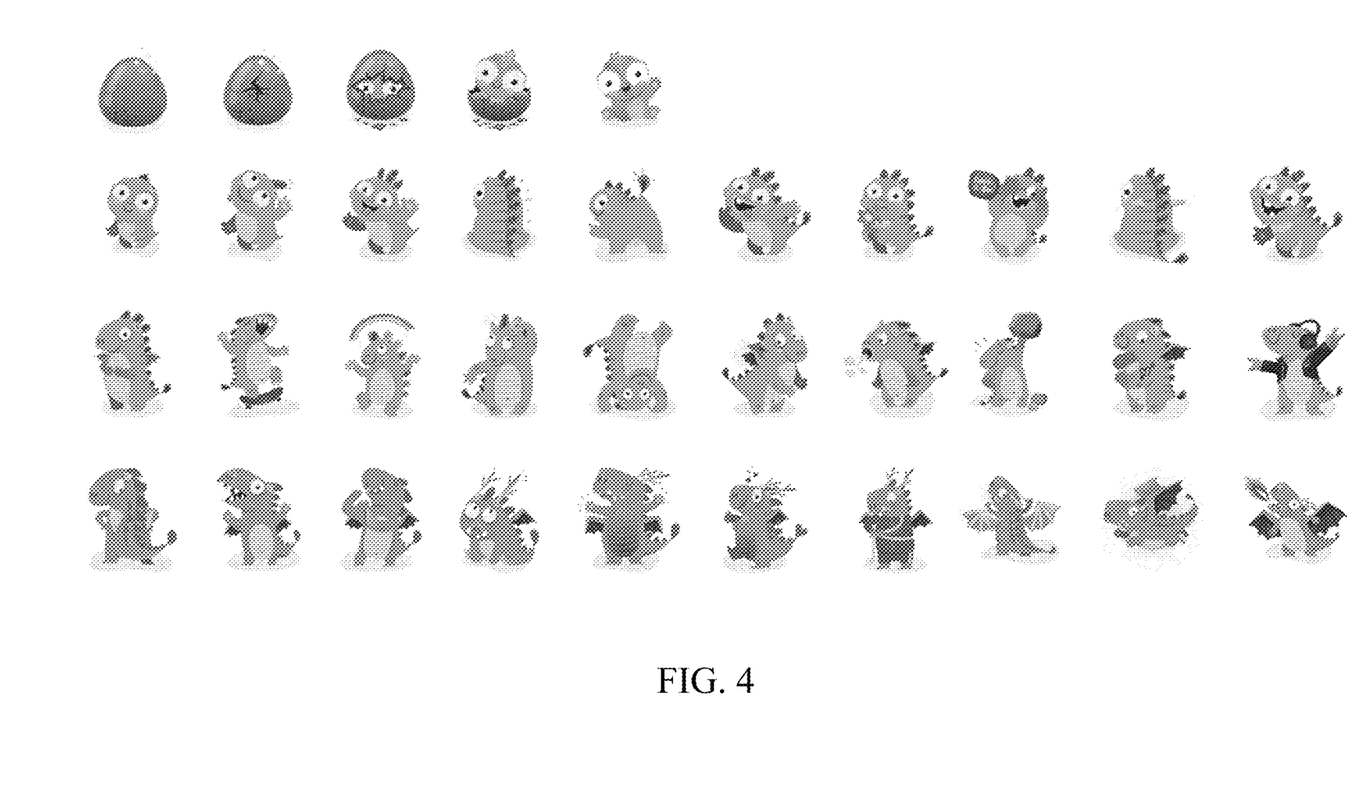
FIG. 4 illustrates exemplary images of four animation levels, which may be used in the parental advisory system to motivate users to read or learn more.

In some embodiments, the user may be given motivational rewards during reading or learning, for example: motivational messages; animation levels; other special rewards depending on reading progress. The examples of such animation levels are shown in FIG. 4. Each row illustrates one of four exemplary animation levels. In some embodiments, the disclosed system may suggest that the user should keep the optimal distance to the device, keep correct posture if the relevant parameters are out of the defined tolerance.

In some embodiments, the distance from the screen to the eyes may be at least 25 cm. In some embodiments, the distance from the screen to the eyes may be at least 50 cm. In some embodiments, the distance from the screen to the eyes may be at least 100 cm.

In some embodiments, the distance from the screen to the eyes must be less than 25 cm. In some embodiments, the distance from the screen to the eyes must be less than 50 cm. In some embodiments, the distance from the screen to the eyes must be less than 100 cm.

In some embodiments, the user's posture is checked. In some embodiments, the shoulder line may be required to be parallel to the eye line.

In some embodiments, since the at least one exemplary electronic computing device may include at least one camera that acquires visual input related to the one or more users' activities, the disclosed may detect head pose and track eye gaze. In some embodiments, the following issues related to the stack of artificial intelligence algorithms are minimized: fast battery discharge; heating of computing electronic devices; slow electronic device operation; sensitivity of tracking and recognition algorithms to external conditions (such as, but not limited to, illumination, device position and attitude). In some embodiments, the accuracy of reading recognition is improved by optimizing the face tracking performance for low light conditions (e.g., up to 40% of accuracy improvement as a result of the high dynamic range (HDR) algorithm); optimizing frame size (e.g., from 40% to 70% of accuracy improvement).

In some embodiments, the combination of the described above techniques result in the total accuracy improvement from 60% to 90%. In some embodiments, the combination of the described above techniques result in the total accuracy improvement from 60% to 80%. In some embodiments, the combination of the described above techniques result in the total accuracy improvement from 60% to 70%. In some embodiments, the combination of the described above techniques result in the total accuracy improvement from 70% to 80%. In some embodiments, the combination of the described above techniques result in the total accuracy improvement from 70% to 90%. In some embodiments, the combination of the described above techniques result in the total accuracy improvement from 80% to 90%.

In some embodiments, the relative improvement, as detailed herein, may be measured in terms of accuracy of the neural network predictions relatively to the accuracy score without applying the described above methods.

In some embodiments, the reading or learning goal may be: 1 min per day. In some embodiments, the reading or learning goal may be: 5 min per day. In some embodiments, the reading or learning goal may be: 10 min per day. In some embodiments, the reading or learning goal may be: 15 min per day. In some embodiments, the reading or learning goal may be: 20 min per day. In some embodiments, the reading or learning goal may be: 30 min per day. In some embodiments, the reading or learning goal may be: 45 min per day. In some embodiments, the reading or learning goal may be: 60 min per day.

In some embodiments, the duration of entertainment (the usage of restricted applications) may be: 1 min per day. In some embodiments, the duration of entertainment (the usage of restricted applications) may be: 20 min per day. In some embodiments, the duration of entertainment (the usage of restricted applications) may be: 40 min per day. In some embodiments, the duration of entertainment (the usage of restricted applications) may be: 60 min per day. In some embodiments, the duration of entertainment (the usage of restricted applications) may be: 80 min per day. In some embodiments, the duration of entertainment (the usage of restricted applications) may be: 120 min per day. In some embodiments, the duration of entertainment (the usage of restricted applications) may be: 180 min per day. In some embodiments, the duration of entertainment (the usage of restricted applications) may be: 300 min per day.

In some embodiments, additional (bonus) duration of entertainment (the usage of restricted applications) may be: +5 min per day. In some embodiments, additional (bonus) duration of entertainment (the usage of restricted applications) may be: +10 min per day. In some embodiments, additional (bonus) duration of entertainment (the usage of restricted applications) may be: +15 min per day. In some embodiments, additional (bonus) duration of entertainment (the usage of restricted applications) may be: +30 min per day.

In some embodiments, the exemplary disclosed software with the exemplary disclosed computer system are configured to utilize video input obtained by a typical camera that may have, among other parameters, an exemplary resolution of 1.3 Mpx or less (e.g., a resolution of 640×480 or above) and an exemplary frame rate in range of 15-60 frame per second (FPS) (e.g., 20 FPS, 30 FPS, 15-30 FPS, 30-60 FPS, etc.) and may lack or include an IR backlight.

In some embodiments, the exemplary disclosed software with the exemplary disclosed computer system are configured to perform all determinations described herein without a need for any physical contact with the user.

In some embodiments, as detailed herein, the exemplary disclosed software with the exemplary disclosed computer system are configured to be applied, without limitation, for one or more of the following uses: working environment and/or information safety, advisory software for people who spend time using computers and electronic devices, parental control systems and other similar suitable computer-related activities and uses.

Figure 1:
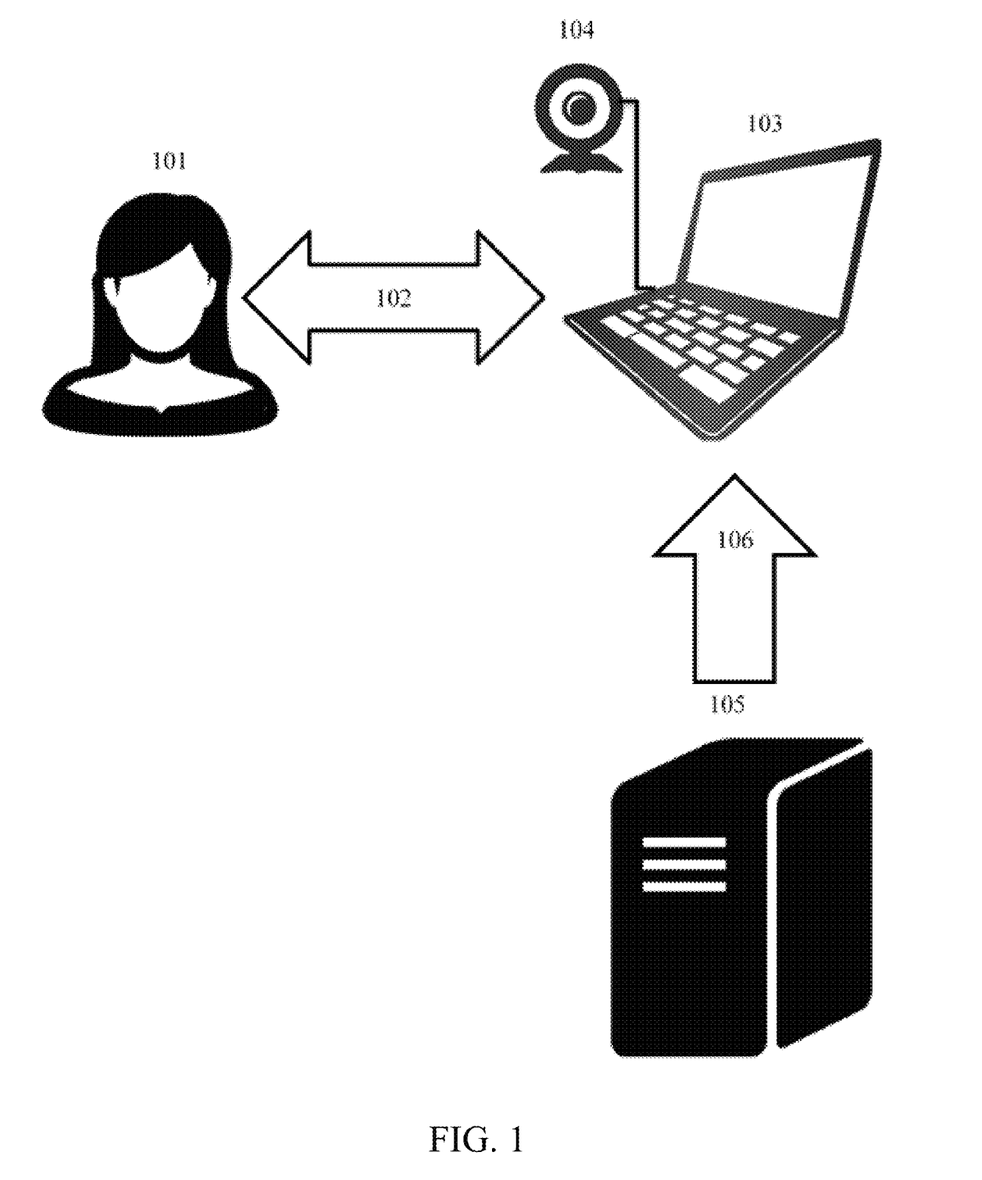
FIG. 1 illustrates an exemplary environment in accordance with at least some embodiments of the present disclosure.

FIG. 1 illustrates an exemplary environment 100 in accordance with at least some embodiments of the present disclosure. As shown in FIG. 1, environment 100 may include a user 101, a computer or mobile device 103, a camera 104 and a server 105. Other devices may also be included. The computer 103 may include any appropriate type of computers, such as desktops, laptops, mobile devices, such as, but not limited to, mobile phones, smartphones and tablets, or any other similarly suitable devices. The exemplary camera 104 may be a built-in camera, or an external camera or any other suitable camera. Further, the server 105 may include any appropriate type of server computer or a plurality of server computers. The user 101 may interact 102 with the computer 103 and the camera 104. The camera 104 continuously tracks the user activity in accordance with one ore principles of the present disclosure as detailed herein. The user 101 may be a single user or a plurality of users. The computer 103 and the server 105 may be implemented on any appropriate computing circuitry platform as detailed herein.

Figure 2:
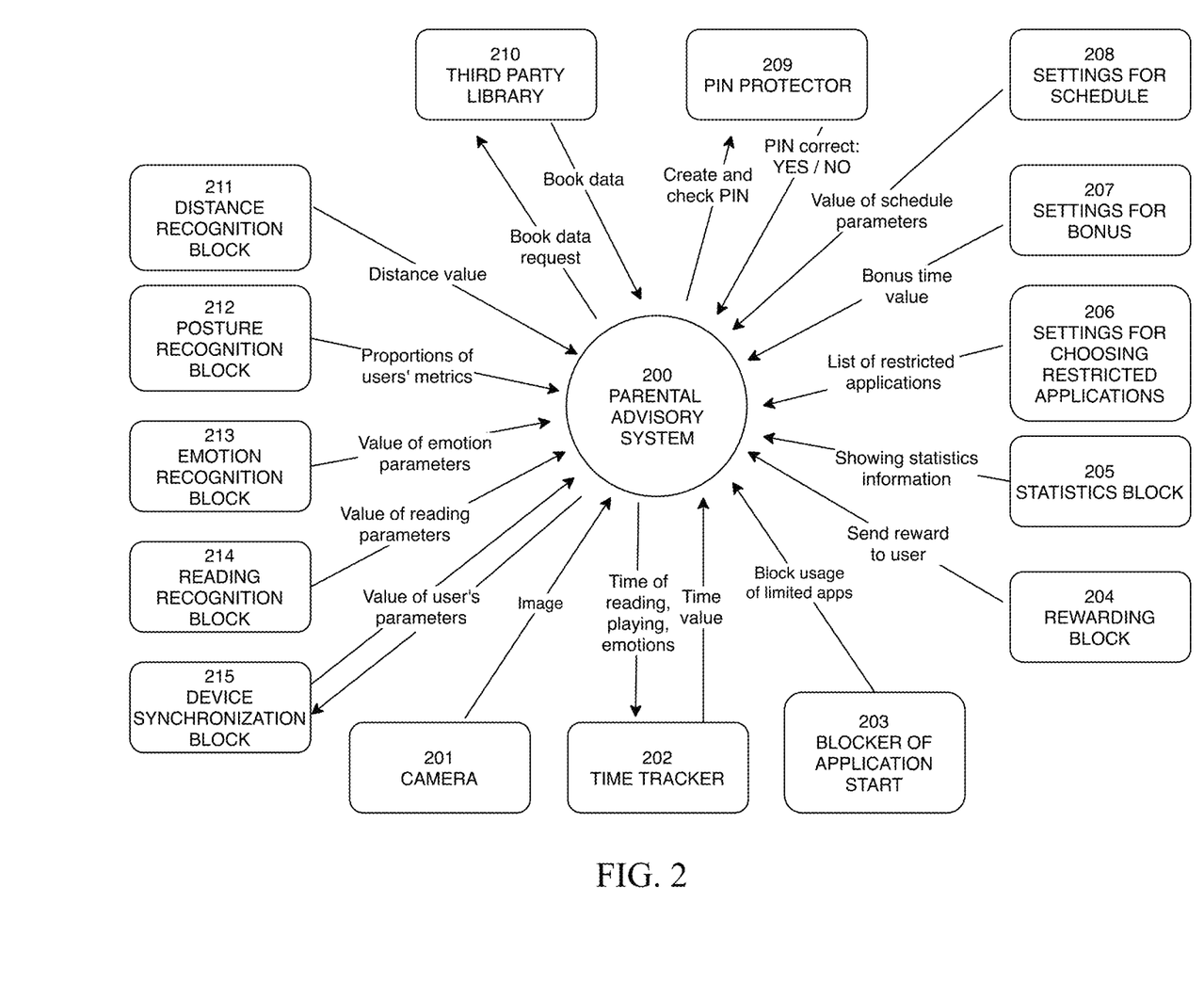
FIG. 2 illustrates an exemplary embodiment of a parental advisory system according to the present disclosure.

FIG. 2 illustrates an exemplary embodiment of the disclosed parental advisory system 200. As shown in FIG. 2, the parental advisory system 200 may include: camera 201 for taking real-time portrait images; time tracker 202 for tracking durations of reading, learning, entertaining and using other electronic content; blocker 203 to block usage of restricted (or limited applications); rewarding block 204 to assign reward activities to the user; statistics block 205 to show statistics (e.g., time spent); settings for choosing restricted applications 206; settings for bonus activities 207; settings for schedule 208; PIN protector 209 (the unit creates and checks PIN number, including checking PIN at application start, assigning restricted applications, setting activity durations); third party libraries 210 (e.g., books, book readers, external browsers); distance recognition 211 to estimate distance between the user and the mobile device screen; posture recognition 212; emotion recognition 213; reading and learning recognition 214. The distance recognition module 211, the posture recognition module 212 and emotion recognition module 213 may include face detection, face tracking and head pose estimation algorithms. The reading recognition module 214 may include eye-gaze estimation and reading detection and classification algorithms. Device synchronization block 215 is used for storing and up-dating users' parameters (e.g., user unique identification number, list of restricted applications, etc.). In some embodiments, the exemplary pose estimation algorithm 212 may be based, at least in part, on the output of the three-dimensional face model in U.S. Pat. No. 10,049,260, which is incorporated by reference herein in entirety. For example, as detailed in U.S. Pat. No. 10,049,260, the output of the three-dimensional face model may be, at least, one of the following: (1) attitude angles; (2) attitude quaternions; (3) translates in camera or screen coordinate system. In some embodiments, the disclosed module 212 may check if the attitude angles, or/and quaternion, or/and translates are within predefined ranges. For example, the disclosed module 212 may check if the attitude angles of the user's head (pitch, roll, yaw)=(0 degree+/− delta_pitch, 0 degree+/− delta_roll, 0 degree+/− delta_yaw).

In some embodiments, delta_pitch, delta_roll, delta_yaw may be 5 degrees. In some embodiments, delta_pitch, delta_roll, delta_yaw may be 10 degrees. In some embodiments, delta_pitch, delta_roll, delta_yaw may be 20 degrees. In some embodiments, delta_pitch, delta_roll, delta_yaw may be 25 degrees. In some embodiments, delta_pitch, delta_roll, delta_yaw may be 5 degrees. In some embodiments, delta_pitch, delta_roll, delta_yaw may be 30 degrees. In some embodiments, delta_pitch, delta_roll, delta_yaw may be 35 degrees. In some embodiments, delta_pitch, delta_roll, delta_yaw may be 40 degrees. In some embodiments, delta_pitch, delta_roll, delta_yaw may be 45 degrees.

In some embodiments, the estimation of distance between the user and the screen 211 may be based, at least in part, on the comparison of the actual interpupillary distance (IPD) and the measured IPD in the screen coordinate system, as described herein.

In some embodiments, the disclosed module 211 may check if the distance between the user's face and the screen is less than a predefined threshold and may display a notification. Non-limiting examples of such threshold values may be: 20 cm, 25 cm, or 30 cm.

In some embodiments, the disclosed module 213 may be based, at least in part, on the emotion recognition results, as detailed in U.S. Pat. No. 10,049,260. For example, as described in U.S. Pat. No. 10,049,260, the emotion recognition algorithm may detect at least one emotion of the user, for example, "fear", "happiness", "joy", "anger", "sadness", etc. In some embodiments, if the disclosed module detects "fear", "anger" or "sadness" during reading activity, the duration of reading activity may be decreased. For example, if the initial duration is set to be 15 min, it may be decreased by 5 minutes. In some embodiments, the disclosed module 214 may be based, at least in part, on the eye-gaze detection and activity recognition results, as detailed herein. For example, as detailed herein, in at least some embodiments, the exemplary disclosed software with the exemplary disclosed computer system are configured to calculate at least one eye-gaze vector using at least the two reference points of the eye pupil and eye center. In some embodiments, two eye-gaze vectors may be calculated, each vector for each user's eye. In other embodiments, two eye-gaze vectors may be averaged. In some embodiments, one or two eye-gaze vectors may be used as inputs for the activity recognition system. For example, the time dependence of eye-gaze vectors may be recorded and the resulting tracks may be used as an input for the activity recognition neural network.

Figure 3:
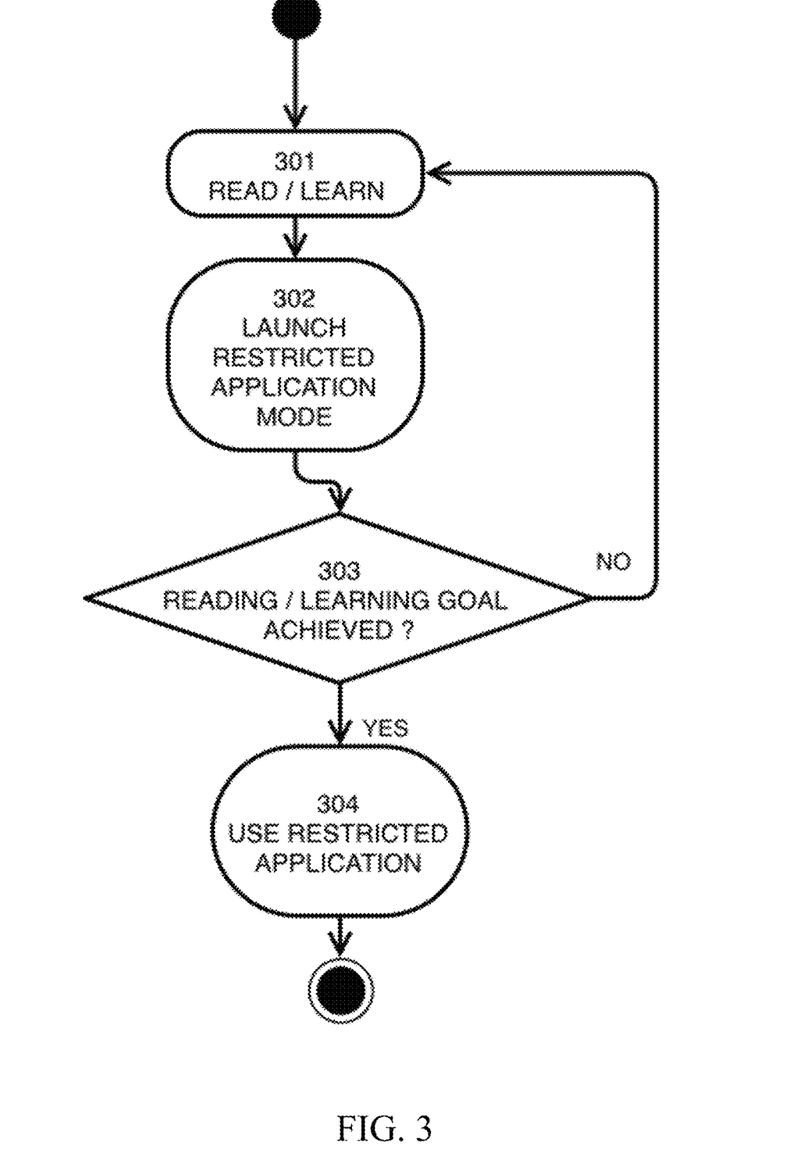
FIG. 3 illustrates an exemplary configuration of an exemplary embodiment of the disclosed parental advisory system.

FIG. 3 illustrates an exemplary configuration of an exemplary embodiment of the disclosed parental advisory system. As shown in FIG. 3, after the system starts the user is prompted to start reading or learning 301. During reading/learning 301, the restricted application mode 302 is activated. The algorithm checks if the reading/learning goal is achieved 303. The exemplary durations of reading or learning are shown in the previous section. If the goal is not achieved, the reading/learning mode continues. Otherwise, the system prompts the user to use restricted applications 304 (e.g., games, entertaining applications).

FIG. 4 illustrates exemplary images of four animation levels, which may be used in the parental advisory system to motivate users to read or learn more.

While a number of embodiments of the present disclosure have been described, it is understood that these embodiments are illustrative only, and not restrictive, and that many modifications may become apparent to those of ordinary skill in the art, including that various embodiments of the disclosed methodologies, the disclosed systems, and the disclosed devices described herein can be utilized in any combination with each other. Further still, the various steps may be carried out in any desired order (and any desired steps may be added and/or any desired steps may be eliminated).

At least some aspects of the present disclosure will now be described with reference to the following numbered clauses hereinafter designated as [C1, C2, C3, C4 . . . ]

C1: A computer-implemented method, comprising: continuously obtaining, by at least one processor, a visual input comprising a plurality of representations of at least one eye of at least one user to continuously track the plurality of representations over a predetermined time duration; wherein the visual input comprises a series of video frames, a series of images, or both; continuously applying, by the at least one processor, at least one eye-gaze movement tracking (EGMT) algorithm to the visual input to form a time series of eye-gaze vectors; continuously inputting, by the at least one processor, the time series of eye-gaze vectors into an Activity Tracking Neural Network (ATNN) to determine an attentiveness level of the at least one user over the predetermined time duration; initiating, by the at least one processor, a first action when the attentiveness level is equal to or above a predetermined threshold attentiveness value throughout the predetermined time duration; and initiating, by the at least one processor, a second action when the attentiveness level is below the predetermined threshold attentiveness value throughout the predetermined time duration.

C2: The method of C1, wherein the visual input further comprises a plurality of representations of at least one additional facial feature of the at least one user, wherein the at least one additional facial feature is chosen from at least one of: eye gaze, head pose, a distance between a user's face and at least one screen, head posture, at least one detected emotion, or combinations thereof.

C3: The method of C2, further comprising, by the at least one processor, continuously applying to the visual input, at least one facial feature algorithm, wherein the at least one facial feature algorithm is chosen from at least one of: at least one face detection algorithm, at least one face tracking algorithm, at least one head pose estimation algorithm, at least one emotion recognition algorithm, or combinations thereof.

C4. The method of C3, wherein application of the at least one facial feature algorithm transforms the representation of the at least one additional facial feature of the at least one user into at least one additional facial feature vector associated with the at least one additional facial feature, wherein the at least one facial feature vector is chosen from: at least one face angle vector, at least one facial coordinate vector, or a combination thereof.

C5: The method of C4, further comprising continuously obtaining a time series of additional facial feature vectors.

C6: The method of C5, wherein the plurality of representations comprises at least one eye movement of at least one user.

C7: The method of C6, wherein the ATNN is trained using a plurality of representations of a plurality of users, wherein each representation depicts each user in an attentive state.

C8: The method of C1, wherein the predetermined time duration ranges from 1 to 300 minutes.

C9: The method of C1, wherein the at least one eye gaze vector comprises at least two reference points, the at least two reference points comprising: a first reference point corresponding to an eye pupil; and a second reference point corresponding to an eye center.

C10: The method of C1, wherein the at least one eye gaze vector is a plurality of eye gaze vectors, wherein the plurality of eye gaze vectors comprises at least one first eye gaze vector corresponding to a first eye and at least one second eye gaze vector corresponding to a second eye.

C11: The method of C10, further comprising a step of, by the at least one processor, averaging the at least one first eye gaze vector and the at least one second eye gaze vector.

C12: The method of C1, wherein the first action is chosen from: a motivational message, unlocking of at least one game level, unlocking of electronic content, or initiation of a bonus round.

C13: The method of C1, wherein the second action comprises preforming the following steps by the at least one processor: resetting the predetermined time duration; and repeating the method over the predetermined time duration until the at least one eye gaze vector indicates that the user's attentiveness level is equal to or above a predetermined threshold attentiveness value throughout the predetermined time duration.

C14: The method of C4, wherein the at least one face angle vector comprises a value for head pitch, head roll, and head yaw.

C15: The method of C4, wherein the at least one facial coordinate vector is a measure of a distance between the user's face and a screen.

C16: The method of C2, wherein the at least one detected emotion is chosen from fear, happiness, joy, anger, or sadness.

C17: A system comprising: a camera component, wherein the camera component is configured to acquire a visual input, wherein the visual input comprises a real-time representation of at least one eye of at least one user and wherein the visual input comprises at least one video frame, at least one image, or both; at least one processor; a non-transitory computer memory, storing a computer program that, when executed by the at least one processor, causes the at least one processor to: continuously apply at least one eye-gaze movement tracking (EGMT) algorithm to the visual input to form a time series of eye-gaze vectors; continuously input the time series of eye-gaze vectors into an Activity Tracking Neural Network (ATNN) to determine an attentiveness level of the at least one user over the predetermined time duration; initiate a first action when the attentiveness level is equal to or above a predetermined threshold attentiveness value throughout the predetermined time duration; and initiate a second action when the attentiveness level is below the predetermined threshold attentiveness value throughout the predetermined time duration.

C18: The system of C17, wherein the visual input further comprises a plurality of representations of at least one additional facial feature of the at least one user, wherein the at least one additional facial feature is chosen from at least one of: eye gaze, head pose, a distance between a user's face and at least one screen, head posture, at least one detected emotion, or combinations thereof.

C19: The system of C18, wherein the at least one processor continuously applies to the visual input, at least one facial feature algorithm, wherein the at least one facial feature algorithm is chosen from at least one of: at least one face detection algorithm, at least one face tracking algorithm, at least one head pose estimation algorithm, at least one emotion recognition algorithm, or combinations thereof.

C20: The system of C19, wherein application of the at least one facial feature algorithm transforms the representation of the at least one additional facial feature of the at least one user into at least one additional facial feature vector associated with the at least one additional facial feature, wherein the at least one facial feature vector is chosen from: at least one face angle vector, at least one facial coordinate vector, or a combination thereof.

C21: The system of C20, wherein the at least one processor continuously obtains a time series of additional facial feature vectors.

C22: The system of C17 wherein the plurality of representations comprises at least one eye movement of at least one user.

C23: The system of C17, wherein the ATNN is trained using a plurality of representations of a plurality of users, wherein each representation depicts each user in an attentive state.

C24: The system of C17, wherein the predetermined time duration ranges from 1 to 300 minutes.

C25: The system of C17, wherein the at least one eye gaze vector comprises at least two reference points, the at least two reference points comprising: a first reference point corresponding to an eye pupil; and a second reference point corresponding to an eye center.

C26: The system of C17, wherein the at least one eye gaze vector is a plurality of eye gaze vectors, wherein the plurality of eye gaze vectors comprises at least one first eye gaze vector corresponding to a first eye and at least one second eye gaze vector corresponding to a second eye.

C27: The system of C17, wherein the at least one processor averages the at least one first eye gaze vector and the at least one second eye gaze vector.

C28: The system of C17, wherein the first action is chosen from: a motivational message, unlocking of at least one game level, unlocking of electronic content, or initiation of a bonus round.

C29: The system of C17, wherein the second action comprises the following steps performed by the at least one processor: resetting the predetermined time duration; and repeating the method over the predetermined time duration until the at least one eye gaze vector indicates that the user's attentiveness level is equal to or above a predetermined threshold attentiveness value throughout the predetermined time duration.

C30: The system of C20, wherein the at least one face angle vector comprises a value for head pitch, head roll, and head yaw.

C31: The system of C20, wherein the at least one facial coordinate vector is a measure of a distance between the user's face and a screen.

C32: The system of C18, wherein the at least one detected emotion is chosen from fear, happiness, joy, anger, or sadness.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the disclosed methodologies, the disclosed systems/platforms, and the disclosed devices described herein can be utilized in any combination with each other. Further still, the various steps may be carried out in any desired order (and any desired steps may be added and/or any desired steps may be eliminated).

The invention claimed is:

1. A computer-implemented method, comprising:
continuously obtaining, by at least one processor of a computing device, a visual input comprising a plurality of representations of at least one eye of at least one user viewing at least one screen of the computing device to continuously track the plurality of representations over a predetermined time duration;
   wherein the visual input comprises a series of video frames, a series of images, or both;
continuously applying, by the at least one processor, at least one eye-gaze movement tracking (EGMT) algorithm to the visual input to form a time series of eye-gaze vectors;
continuously inputting, by the at least one processor, the time series of eye-gaze vectors into an Activity Tracking Neural Network (ATNN) to determine an attentiveness level of the at least one user over the predetermined time duration;
initiating, by the at least one processor, a first action with the computing device when the attentiveness level is equal to or above a predetermined threshold attentiveness value throughout the predetermined time duration; and
initiating, by the at least one processor, a second action with the computing device when the attentiveness level is below the predetermined threshold attentiveness value throughout the predetermined time duration;
   wherein the predetermined threshold attentiveness value indicates whether the at least one user is performing an activity chosen from at least one of: reading on the computing device, learning on the computing device, studying on the computing device, or any combination thereof, throughout the predetermined time duration.

2. The method of claim 1, wherein the visual input further comprises a plurality of representations of at least one additional facial feature of the at least one user, wherein the at least one additional facial feature is chosen from at least one of: head pose, a distance between the at least one user's face and at least one screen, head posture, at least one detected emotion, or combinations thereof.

3. The method of claim 2, further comprising, by the at least one processor, continuously applying to the visual input, at least one facial feature algorithm, wherein the at least one facial feature algorithm is chosen from at least one of: at least one face detection algorithm, at least one face tracking algorithm, at least one head pose estimation algorithm, at least one emotion recognition algorithm, or combinations thereof.

4. The method of claim 3, wherein application of the at least one facial feature algorithm transforms the representation of the at least one additional facial feature of the at least one user into at least one additional facial feature vector associated with the at least one additional facial feature, wherein the at least one facial feature vector is chosen from: at least one face angle vector, at least one facial coordinate vector, or a combination thereof.

5. The method of claim 4, further comprising continuously obtaining a time series of additional facial feature vectors.

6. The method of claim 1, wherein the plurality of representations comprises at least one eye movement of at least one user.

7. The method of claim 1, wherein the ATNN is trained using a plurality of representations of a plurality of users, wherein each representation depicts each user of the plurality of users in an attentive state.

8. The method of claim 1, wherein the predetermined time duration ranges from 1 to 300 minutes.

9. The method of claim 1, wherein each eye gaze vector of the time series of eye gaze vectors comprises at least two reference points, the at least two reference points comprising:
   a first reference point corresponding to an eye pupil; and
   a second reference point corresponding to an eye center.

10. The method of claim 1, wherein the time series of eye gaze vectors comprises at least one first set of eye gaze vectors corresponding to a first eye and at least one second set of eye gaze vectors corresponding to a second eye.

11. The method of claim 10, further comprising a step of, by the at least one processor, averaging the at least one first eye gaze vector and the at least one second eye gaze vector.

12. The method of claim 1, wherein the first action is chosen from: a motivational message, unlocking of at least one game level, unlocking of electronic content, or initiation of a bonus round.

13. The method of claim 1, wherein the second action comprises preforming the following steps by the at least one processor:
   resetting the predetermined time duration; and
   repeating the method over the predetermined time duration until the time series of eye gaze vectors indicates that the at least one user's attentiveness level is equal to or above a predetermined threshold attentiveness value throughout the predetermined time duration, thereby indicating that the at least one user has performed the activity chosen from at least one of: reading on the computing device, learning on the computing device, studying on the computing device, or any combination thereof, throughout the predetermined time duration.

14. The method of claim 4, wherein the at least one face angle vector comprises a value for head pitch, head roll, and head yaw.

15. The method of claim 4, wherein the at least one facial coordinate vector is a measure of a distance between the at least one user's face and a screen.

16. The method of claim 2, wherein the at least one detected emotion is chosen from fear, happiness, joy, anger, or sadness.

17. A system comprising:
   a computing device comprising a camera component, wherein the camera component is configured to acquire a visual input, wherein the visual input comprises a real-time representation of at least one eye of at least one user viewing at least one screen of the computing device and wherein the visual input comprises at least one video frame, at least one image, or both;
   at least one processor;
   a non-transitory computer memory, storing a computer program that, when executed by the at least one processor, causes the at least one processor to:
      continuously apply at least one eye-gaze movement tracking (EGMT) algorithm to the visual input to form a time series of eye-gaze vectors;
      continuously input the time series of eye-gaze vectors into an Activity Tracking Neural Network (ATNN) to determine an attentiveness level of the at least one user over the predetermined time duration;
      initiate a first action with the computing device when the attentiveness level is equal to or above a predetermined threshold attentiveness value throughout the predetermined time duration; and
      initiate a second action with the computing device when the attentiveness level is below the predetermined threshold attentiveness value throughout the predetermined time duration;

wherein the predetermined threshold attentiveness value indicates whether the at least one user is performing an activity chosen from at least one of: reading on the computing device, learning on the computing device, studying on the computing device, or any combination thereof, throughout the predetermined time duration.

18. The system of claim 17, wherein the first action is chosen from: a motivational message, unlocking of at least one game level, unlocking of electronic content, or initiation of a bonus round.

19. The system of claim 17, wherein the second action comprises the following steps performed by the at least one processor:

resetting the predetermined time duration; and repeating the method over the predetermined time duration until the time series of eye gaze vectors indicates that the user's attentiveness level is equal to or above a predetermined threshold attentiveness value throughout the predetermined time duration, thereby indicating that the at least one user has performed the activity chosen from at least one of: reading, learning, studying, or any combination thereof, throughout the predetermined time duration.

20. The system of claim 17 wherein the plurality of representations comprises at least one eye movement of at least one user.

* * * * *